United States Patent [19]

De Groot

[11] Patent Number: 5,134,409
[45] Date of Patent: Jul. 28, 1992

[54] SURVEILLANCE SENSOR WHICH IS PROVIDED WITH AT LEAST ONE SURVEILLANCE RADAR ANTENNA ROTATABLE ABOUT AT LEAST ONE FIRST AXIS OF ROTATION

[75] Inventor: Gerrit De Groot, Hengelo, Netherlands

[73] Assignee: Hollandse Signaalapparaten B.V., Hengelo, Netherlands

[21] Appl. No.: 407,383

[22] Filed: Sep. 14, 1989

[30] Foreign Application Priority Data

Sep. 16, 1988 [NL] Netherlands .................. 8802289

[51] Int. Cl.$^5$ .................. G01S 13/56; G01S 13/72
[52] U.S. Cl. .................. 342/52; 342/53; 342/158; 342/430; 342/449; 342/96
[58] Field of Search .................. 342/52, 28, 53, 158, 342/368, 430, 449, 91

[56] References Cited

U.S. PATENT DOCUMENTS

| | | | |
|---|---|---|---|
| 2,550,700 | 5/1951 | Lancor, Jr. et al. | 342/52 |
| 2,895,127 | 7/1959 | Padgett | 342/53 |
| 3,010,102 | 11/1961 | Ketchledge et al. | 342/53 |
| 3,025,515 | 3/1962 | Fairbanks | 342/53 |
| 3,076,961 | 2/1963 | Bibbero | 342/53 |
| 3,108,270 | 10/1963 | Fairbanks | 342/53 |
| 3,114,149 | 12/1963 | Jessen, Jr. | 343/720 |
| 3,945,007 | 3/1976 | Radford | 342/52 |
| 4,050,068 | 9/1977 | Berg et al. | 342/53 |
| 4,122,521 | 10/1978 | Rick et al. | 342/52 X |
| 4,158,840 | 6/1979 | Schwab | 342/52 |
| 4,224,618 | 9/1980 | Rich et al. | 342/182 |
| 4,333,077 | 6/1982 | Teilhet | 342/52 |
| 4,477,814 | 10/1984 | Brumbraugh et al. | 342/53 X |
| 4,761,650 | 8/1988 | Masuda et al. | 342/26 |
| 4,780,719 | 10/1988 | Frei et al. | 342/53 |
| 4,975,705 | 12/1990 | Gellekink et al. | 342/52 |
| 4,995,102 | 2/1991 | Ichinose et al. | 342/158 |

FOREIGN PATENT DOCUMENTS 53-15094 10/1978 Japan.
1196241 6/1970 United Kingdom.
1305011 1/1973 United Kingdom.

OTHER PUBLICATIONS

Hoge, F. E., "Integrated Laser/Radar Satellite Ranging and Tracking System", Applied Optics, vol. 13, No. 10, Oct. 1974, pp. 2352-2358.

Primary Examiner—John B. Sotomayor
Attorney, Agent, or Firm—Robert J. Kraus

[57] ABSTRACT

The invention relates to a surveillance sensor provided with at least one surveillance radar antenna 1 and at least one co-located and co-rotating electro-optical surveillance sensor 5 mechanically connected to said radar antenna. A combined panoramic picture is compiled by combining information from both sensors using a common track unit 30.

15 Claims, 3 Drawing Sheets

SURVEILLANCE SENSOR WHICH IS PROVIDED WITH AT LEAST ONE SURVEILLANCE RADAR ANTENNA ROTATABLE ABOUT AT LEAST ONE FIRST AXIS OF ROTATION

BACKGROUND OF THE INVENTION

The invention relates to a surveillance sensor which is provided with at least one surveillance radar antenna rotatable about at least one first axis of rotation.

An embodiment in which such a surveillance radar antenna rotates about a vertically oriented axis of rotation at a fixed rotation rate, has the disadvantage that the information obtained by such an antenna is limited to azimuth and range data of the detected objects. However, for tracking a moving object by means of a surveillance radar antenna or for controlling a tracking radar which is to track an object detected by the surveillance radar antenna, it is advantageous to have the disposal of additional elevation data of the object. Indeed, additional elevation data may be obtained by a so-called phased-array surveillance antenna, but the disadvantage of this antenna is that it is expensive and complex. An further disadvantage is that even a radar, capable of providing information concerning the speed of detected objects on the basis of the Doppler effect, has trouble detecting stationary or slowly moving objects in a high-clutter environment, e.g. helicopters above land.

SUMMARY OF THE INVENTION

The present invention has for its object to provide a surveillance sensor which obviates the said disadvantages and which is characterised in that the surveillance sensor is provided with at least one electro-optical sensor mechanically connected to the surveillance radar antenna.

The azimuth and elevation information for a relatively inexpensive electro-optical sensor can now be combined in a simple way with the azimuth and range information from a radar sensor. The combination obviates any problems caused by mutual alignment and parallax of the lines-of-sight of two separate sensors placed at a certain distance from each other.

When positioned on a ship, the alignment between two separate sensors with a certain distance between them, may fluctuate due to distortion of the ship. The parallax taken as the difference in the angle at which both sensors observe a target, is now fractional, while the alignment is simple and stable. The mutual distance between two sensors of 5 metres gives a maximum parallax of 5 mrad in angle for an object at a 1 km distance, which parallax amply exceeds the resolving power of an electro-optical surveillance sensor which can amount to 0.5 mrad.

Moreover, both costs and space are saved because only one common stabilisation system is used.

By combining the information from two sensors, active at a different wavelength range, the detection of stationary objects in high-clutter environments is improved. Indeed, the target contrast may be high due to e.g. reflections or heat radiation from hot engine parts in the visible or infrared range, while the contrast in the radar wavelength range is low. Moreover, an electro-optical sensor can be used to select objects of particular expected dimensions, thus providing an additional aid in distinguishing targets from their background.

It should be noted that radar trackers exist which are assisted in detecting a target by, e.g. an infrared surveillance sensor. After detection of a target by an infrared surveillance sensor, the radar tracker takes over the target and keeps tracking it by continuously pointing a track antenna at the target. However, a radar tracker of this kind cannot be used to give an overall picture of the surroundings, contrary to a surveillance radar, which for this purpose periodically rotates an antenna about a usually vertical axis at a customary rotation time of at least several seconds required for sufficient illumination of a target.

Moreover, infrared surveillance equipment exists which provides a panoramic picture of the surroundings by also rotating about a vertical axis. Rotation times up to approximately half a second are customary for this equipment. Owing to the usually high resolution of an optical sensor, lower rotation times may lead to blurring in case of positioning on a moving platform. A combination of both types of surveillance sensors is, for this reason amongst others, not obvious, because it would lead to a degradation in properties of one or both surveillance sensors.

Patent application EP 0.205.794 discloses a cooperation between a radar apparatus and an infrared surveillance device. However, this invention does not yet concern an integrated design of an infrared sensor with a radar antenna, but is based on any known radar antenna and an independently operating infrared surveillance device mounted separately beside the radar antenna.

This combination has all the disadvantages relating to mutual alignment and parallax as discussed above. Besides, the radar antenna is not assigned any independent task, but is only used to verify the detections of the IR surveillance device.

In this case, the problem relating to different rotation rates of the two systems is obviated by not integrating the two units mechanically, in contrast with the present invention.

An advantageous embodiment is characterized in that the electro-optical sensor is rotatable about the first axis of rotation. This results in a wide azimuth range of the electro-optical sensor.

Another advantageous embodiment is characterized in that the electro-optical sensor is so rigidly connected to the surveillance radar antenna that the rate of rotation about the first axis of rotation is the same for the electro-optical sensor and the surveillance radar antenna. The rigid connection provides a stable alignment and obviates the need to provide separate rotation means for the electro-optical sensor.

Another advantageous embodiment is characterized in that the surveillance radar antenna is provided with rotation drive means suitable for rotating the electro-optical sensor about the first axis of rotation with respect to the surveillance radar antenna. In this case, the electro-optical sensor may rotate at a higher rate to obtain data at a higher frequency. On the other hand, a lower rate of rotation can increase the sensitivity of the electro-optical sensor.

A low pulse momentum of the surveillance antenna is obtained in an embodiment characterised in that the electro-optical sensor is connected to the surveillance radar antenna in such a way that the electro-optical sensor is mounted practically in line with the first axis of rotation.

An alternative embodiment of the surveillance sensor is characterised in that at least one line of sight of the electro-optical sensor practically coincides with at least one line of sight of the surveillance radar antenna. The advantage of this construction is that the information from the radar antenna and from the electro-optical sensor can be correlated instantly.

An embodiment characterised in that at least one line of sight of the electro-optical sensor is directed opposite to at least one line of sight of the surveillance radar antenna has the advantage that an object is observed by one of the two sensors at a higher repetition frequency.

An embodiment characterised in that the electro-optical sensor is provided with detector elements arranged in a row, which detector elements form a line, parallel to the first axis of rotation, of the field of view covered by the electro-optical sensor has the advantage that no mechanical scanning means are required for the electro-optical sensor.

Furthermore, an advantageous embodiment of the surveillance sensor is characterised in that the detector elements are sensitive to infrared radiation. The advantage of this embodiment is that the electro-optical sensor can also be used at night.

Another embodiment of the surveillance sensor, comprising special advantages, is characterised in that the electro-optical sensor and surveillance radar antenna are adjustable with respect to each other across a limited angle about a second axis of rotation, the surveillance sensor is provided with adjusting means suitable for executing the said adjustment, and the second axis of rotation is oriented practically perpendicular to the first axis for rotation.

A wide elevation range is thus obtained, where the electro-optical sensor and the radar antenna each illuminate a section of that elevation range. In case the radar antenna has a wider elevation range than the electro-optical sensor, the latter may be adjusted in elevation, if necessary per revolution.

An alternative embodiment having the same advantage as the one described above is characterised in that the electro-optical sensor is provided with at least one optical deflection element suitable for deflecting an optical line of sight of the electro-optical sensor across a limited angle about a third axis oriented perpendicular to the first axis of rotation.

When the sensor is mounted on a moving platform, orientation stabilisation will be advisable. A first embodiment is thereto characterised in that the surveillance radar antenna is provided with first orientation stabilisation means suitable for perpendicularly orienting the first axis of rotation with respect to an earth-oriented reference plane. In this construction the entire surveillance sensor is stabilised.

A second embodiment is characterised in that the surveillance radar antenna is provided with beam-orientation adjusting means. In this embodiment, control of the beam orientation results in a stabilised sweep. Because the need for an expensive and heavy stabilisation unit for the surveillance radar antenna is now obviated, the advantage of this embodiment is that the surveillance sensor remains light-weight and inexpensive.

A further advantage is that the stabilisation requires only a very low time constant, because mass inertia effects of the mass of the entire surveillance sensor do not play a part.

A third embodiment is characterised in that the second orientation-stabilisation means comprise a mirror adjustable in angle and mounted on the optical axis of the electro-optical sensor. Separate stabilisation of the electro-optical sensor reduces blurring of the picture recorded.

An advantage of an application of an electro-optical sensor relates to the undetectability of the sensor due to its passive character. To retain this advantage in a combination with a radar it is advisable to link the surveillance antenna with a transmitter generating low-intensity radar radiation. A favourable embodiment of a radar system is characterised in that the surveillance radar antenna is provided with an FM-CW transmitting and receiving device.

The advantages of combination are increased in an embodiment where the surveillance sensor is provided with a radar plot extractor connected to the surveillance radar antenna for obtaining each antenna revolution at least azimuth, range and doppler speed information; with an electro-optical plot extractor connected to the electro-optical sensor for obtaining at least azimuth and elevation information each revolution of the electro-optical sensor; and with a common track unit connected to the radar plot extractor and the electro-optical plot extractor for combining the information obtained, for generating on the basis of the combined information a target track to control a weapon system to be connected. By combining the information originating from both sensors in the earliest stage possible, and subsequently supplying it to a common track unit, a considerable amount of time is gained in comparison with a configuration comprising a separate track unit for each sensor.

In an embodiment where the track unit comprises a fast logic unit for promoting combined information to a target track within the time required for one revolution of the surveillance sensor, if this information complies with preset criteria, the normal track process may be reduced for urgent situations.

BRIEF DESCRIPTION OF THE DRAWING

The invention will now be explained with reference to the accompanying figures, of which.

DESCRIPTION OF THE PREFERRED EMBODIMENTS

Figure 1:
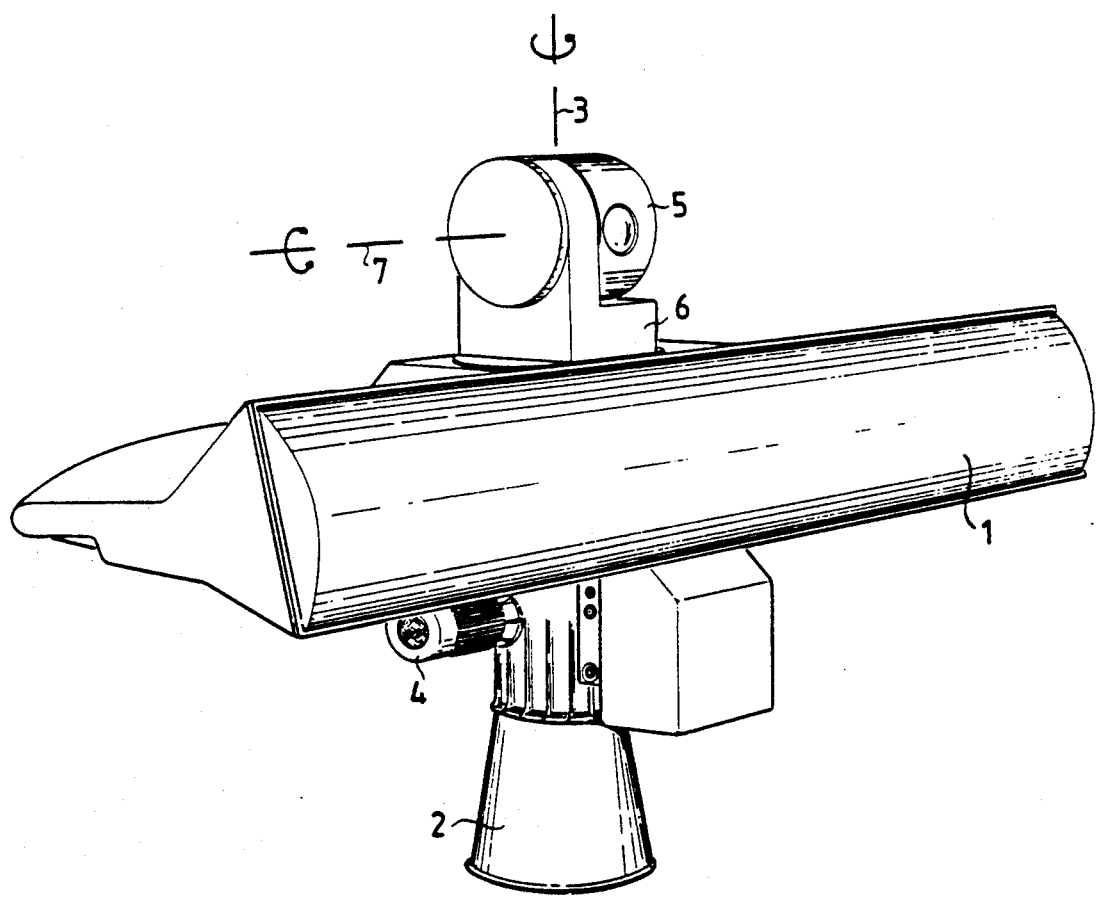
FIG. 1 represents the surveillance radar antenna provided with an electro-optical sensor.

An embodiment according to the invention is shown in FIG. 1. A surveillance radar antenna 1 is rotatable with respect to an antenna support 2 about a first axis of rotation 3 by means of drive means 4. In this embodiment, surveillance radar antenna 1 is a well-known slotted waveguide. An electro-optical sensor 5 is fixed in line with the first axis of rotation 3 on surveillance radar antenna 1 by means of fixing means 6. The electro-optical sensor 5 is rotatable about a second axis of rotation 7 oriented perpendicular to the first axis of rotation 3.

Figure 2:
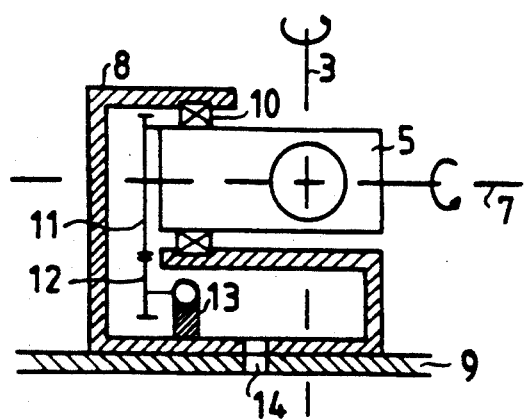
FIG. 2 is a schematic diagram of a rotation-fixed embodiment of the attachment of the electro-optical sensor.

A first feasible embodiment of fixing means 6 is shown in FIG. 2. The electro-optical sensor 5 is suspended in a supporting frame 8 which is fixed to a top side 9 of surveillance radar antenna 1. The electro-optical sensor 5 is rotatable about a second axis of rotation 7, which is oriented perpendicular to the first axis of rotation 3, and is thereto provided with suitable bearing 10, rotation drive means comprising a gear transmission 11 and 12 which are linked with servo motor 13. The optical line of sight of electro-optical sensor 5 in this embodiment crosses the first axis of rotation 3. A feed-through aperture 14 is provided for feeding through electrical and/or optical signal carriers to and from the electro-optical sensor 5.

Figure 3:
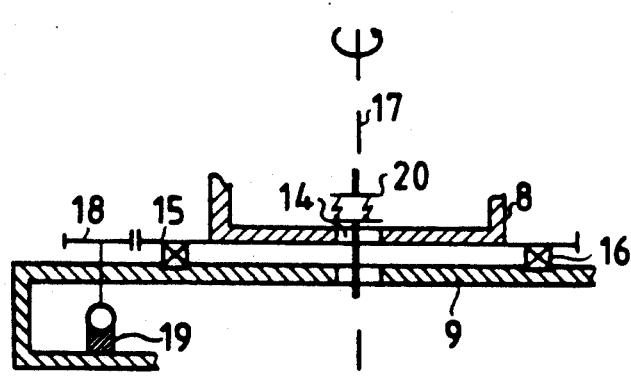
FIG. 3 is a schematic diagram of a rotatable embodiment of the electro-optical sensor.

FIG. 3 shows an embodiment of a rotatable connection of the electro-optical sensor 5 to the surveillance radar antenna 1. Frame 8, in which the electro-optical sensor 5 is suspended, is fixed to a supporting part 15 which is supported by a bearing 16. This bearing 16 allows rotation of the supporting part 15 about an axis of rotation 17 with respect to top side 9 of surveillance radar antenna 1. In this embodiment, this axis of rotation 17 coincides with the first axis of rotation 3, but axis of rotation 17 may also run parallel but not coincidental with the first axis of rotation 3. Gear transmission 18 and servo motor 19 are applied for this rotation. To allow feed-through of electrical and/or optical signal carriers, feed-through aperture 14 is provided, as well as a well-known rotatable electrical and/or optical coupling 20.

Figure 4:
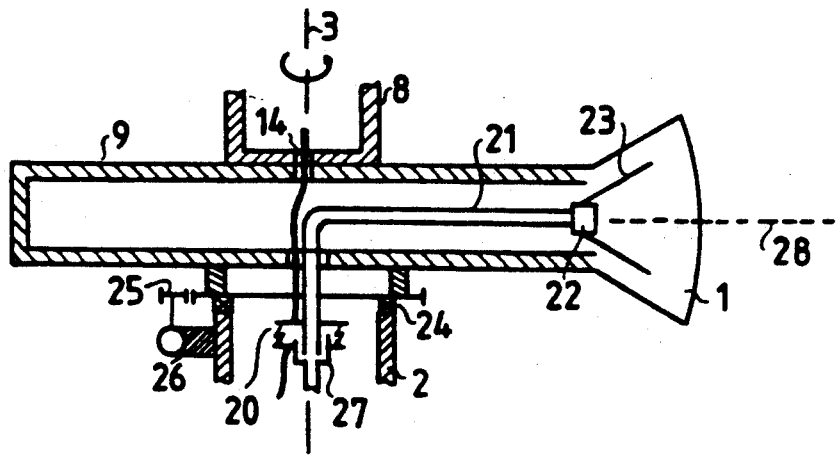
FIG. 4 is a schematic diagram of the attachment of the surveillance radar antenna on a platform.

FIG. 4 is a schematic diagram of the attachment of radar antenna 1 to antenna support 2. Of the radar antenna, only a waveguide 21 to a slotted waveguide 22 with beamforming plates 23 is depicted. These beamforming plates are adjustable in elevation angle, allowing control of the antenna orientation in elevation. This allows a stabilised sweep of the beam axis. In an embodiment comprising a radar with electronic beamforming, the same effect can be obtained by means of electronic control of the beam orientation. In this embodiment, frame 8 in which the electro-optical sensor 5 is suspended is rigidly fixed to top side 9 of surveillance radar antenna 1. By means of a bearing 24, radar antenna 1 is able to rotate with respect to antenna support 2 about axis of rotation 3. For this purpose, a gear transmission 25 and a servo motor 26 are applied. The rotatable electric and/or optical coupling 20 function as a rotatable coupling between electric and/or optical signal carriers to electro-optical sensor 5. Besides, a rotary waveguide coupling 27 is applied for waveguide 21.

Depending on the mechanical construction of radar antenna 1, the electro-optical sensor 5 can also be fixed in other positions, e.g. in line with the radar beam axis 28 on the back of the antenna. An alternative embodiment is obtained by fixing the electro-optical sensor 5 inside the cover of radar antenna 1.

Electro-optical sensor 5 is preferably an infrared-sensitive sensor which is also capable of functioning at night and under adverse atmospheric conditions. A more cost-effective embodiment is obtained with a daylight sensor such as a common TV camera or a image intensifier.

A combination of the above-mentioned types of sensors has the advantage of increasing the detection probability because it enables selection of the sensor that offers the optimal target contrast.

The electro-optical sensor 5 is preferably a complete, autonomous camera unit provided with the necessary optics, radiation-sensitive elements and, if applicable, cooling equipment and control electronics for sampling and filtering of the received signals. To reduce blurring due to movement to a minimum, the electro-optical sensor may be provided with mirrors or prisms adjustable in angle and positioned on the optical axis.

In case of the embodiment comprising the infrared sensor, a favourable embodiment is obtained when use is made of a line array of infrared sensitive elements, where the line array has a vertical orientation in the field of view. The scanning movement perpendicular to the longitudinal direction of the line array, required for picture compilation, is obtained by means of rotation of the electro-optical sensor 5 about the first axis of rotation 3. Furthermore, the electro-optical sensor 5 can be supplemented with a laser rangefinder for obtaining range information independent of the radar.

Figure 5:
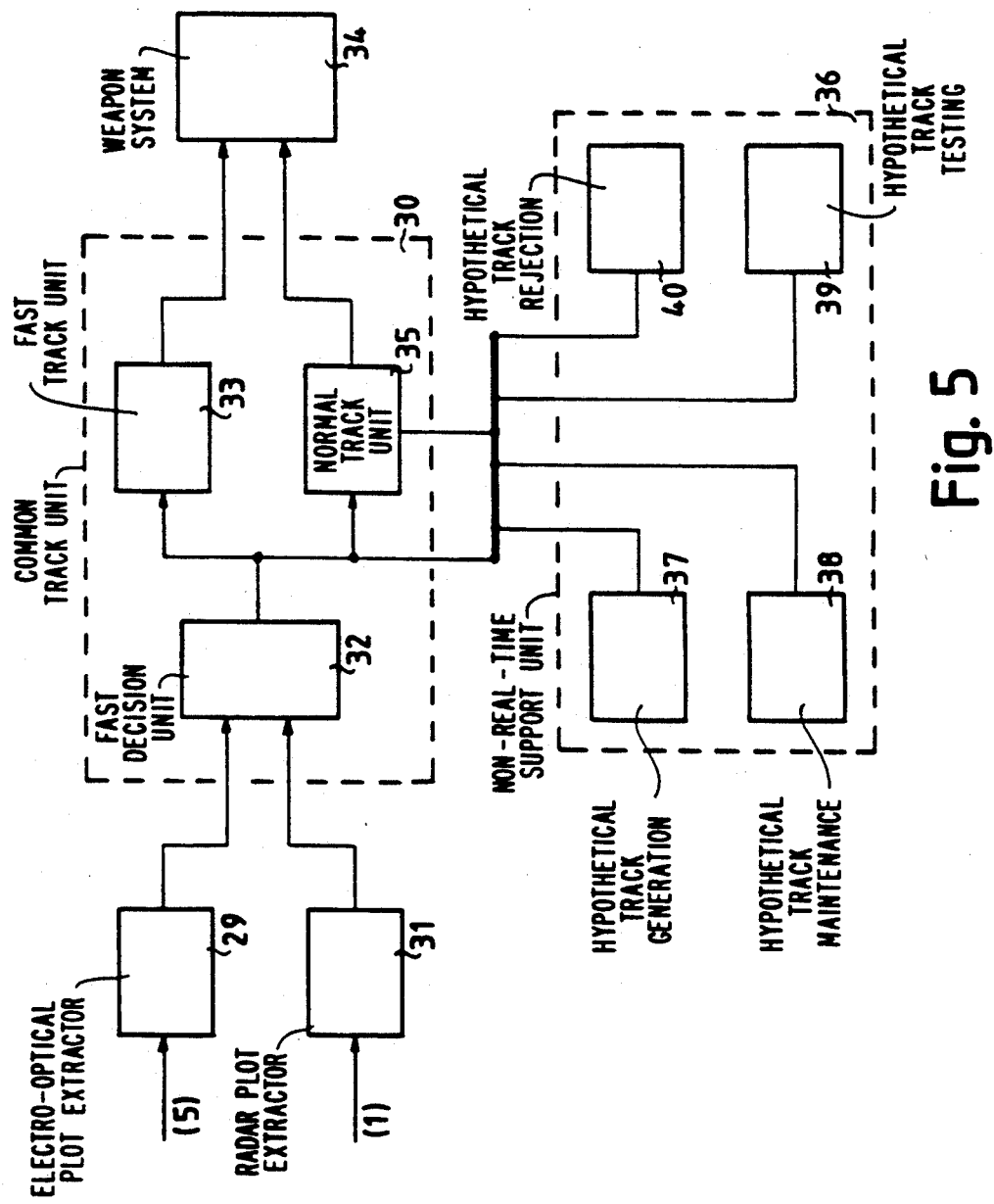
FIG. 5 shows a signal processing unit for the combination of the signals from the surveillance radar antenna and the electro-optical sensor.

FIG. 5 shows the signal processing unit relevant to the combination of signals. In this signal processing part, signals originating from the electro-optical sensor 5 are supplied to a plot extractor 29. In this plot extractor 29 extraction of targets takes place by means of known image processing techniques. The azimuth, elevation and intensity values of possible targets obtained per full revolution of the rotating sensor 5, are subsequently supplied to a common track unit 30. The signals originating from surveillance radar antenna 1 are supplied to known radar plot extraction means 31, which provide at least range, azimuth, signal strength and doppler speed information of possible targets. This information is also supplied per revolution of the antenna 1 to the common track unit 30. In case of a 3D surveillance radar antenna 1, elevation information is also added.

Track unit 30 comprises a fast decision unit 32 for the purpose of selecting threatening situations in which the usual track processing would take too much time. This is the case, for instance, when a helicopter, appearing above the edge of a wood during a short time to detect a target, subsequently disappears to assign a weapon and reappears to fire the weapon. The usual track processing would in that case take too much time to allow target engagement within the short time the helicopter is visible. Fast decision unit 32 therefore selects targets with a Doppler speed of practically zero and an elevation around the visible horizon to supply this information to a fast track unit 33 which, preferably within the time required for one revolution, generates a track for the purpose of control of weapon system 34. A track in this case is understood to be target position information related to a target within a fixed coordinate system and during several measurements, suitable to control a weapon system. It should be noted that in the case of surveillance radar, it is customary to only generate a track after several revolutions of the antenna, which would in this case take too much time. However, the available elevation information and simultaneous detection in another wavelength range as a result of the combination with an electro-optical sensor may produce a reasonably reliable track after only one revolution.

In non-threatening situations, the information from both sensors is supplied to a normal track unit 35. Here combination takes place of the information from both sensors on the basis of common azimuth values. The combined information is then mathematically expressed in a vector of state characterising the target, which vector is adapted each measurement to new information from one or both sensors. Track unit 35 uses well-known track algorithms with preset parameters dependent on the expected target trajectory. For example, for a straight target trajectory other parameters should be selected than for a curved target trajectory. A target may have a sinusoidal trajectory of become temporarily invisible. The latter occurs in the case of a helicopter popping up every now and again from behind the edge of a wood. Well-known track algorithms are for instance $\alpha$, $\beta$, $\gamma$ algorithms, with parameters $\alpha$, $\beta$ and $\gamma$ for weighting respectively the target position, target speed and target acceleration. It is important that the track unit 35, at predetermined intervals, should generate track data to control weapon system 34. Processing of the information originating from extractors 29 and 31 should preferably be completed well within the time required for a next measurement. A process subject to strict time limits is therefore also characterised as a real-time process. However, because of the variety of available information originating from sensors operating in different wavelength ranges and the complex environment in the case of land-based applications, it is advisable not to limit the track processing to one algorithm only. For this reason, the track process is supported by a non-real-time support unit 36. Support unit 36 draws up hypothesis concerning the target and the target trajectory. With these hypothesis the parameters of the track algorithms can be determined. Within the support unit 36, a distinction can be made between functions for the generation of new hypotheses (37), for maintaining hypotheses (38), reflecting hypotheses (39) and for testing of hypotheses (40). New hypotheses may consist of the various target trajectories mentioned before. Maintaining hypotheses implies that it is assessed whether the tracks suit the hypotheses selected.

Support unit 36 uses artificial intelligence technique in contrast to the strict algorithmic track processes of track unit 30.

I claim:

1. A surveillance apparatus comprising a surveillance radar antenna rotatable about a first axis of rotation for obtaining information representing the range and azimuth of a detected object and an electro-optical sensor rotatable about the first axis asynchronously with respect to the radar antenna for rotatably scanning azimuths scanned by said radar antenna and obtaining additional information representative of at least one characteristic of the detected object, said surveillance apparatus further comprising:
   a. a radar plot extractor electrically connected to the surveillance radar antenna for obtaining during each revolution of said antenna at least azimuth, range and doppler speed information;
   b. an electro-optical plot extractor electrically connected to the electro-optical sensor for obtaining during each revolution of said sensor at least azimuth and elevation information; and
   c. a common track unit selectively connected to the radar plot extractor and the electro-optical plot extractor for combining the information obtained thereby and generating, on the basis of the combined information, information representative of a target track.

2. A surveillance sensor as claimed in claim 1, characterised in that the electro-optical sensor is mounted for rotation about the first axis of rotation relative to the surveillance radar antenna.

3. A surveillance sensor is claimed in claim 1, characterised in that the electro-optical sensor is connected to the surveillance radar antenna in such a way that the electro-optical sensor is mounted substantially in line with the first axis of rotation.

4. A surveillance sensor as claimed in claim 1, characterised in that the electro-optical sensor is provided with at least one optical deflection element suitable for deflecting an optical line of sight of the electro-optical sensor across a limited angle about a third axis oriented perpendicular to the first axis of rotation.

5. A surveillance sensor as claimed in claim 1, characterised in that the surveillance radar antenna is provided with first orientation stabilisation means suitable for perpendicularly orienting the first axis of rotation with respect to an earth-oriented reference plane.

6. A surveillance sensor as claimed in claim 1, characterised in that the surveillance radar antenna is provided with beam-orientation adjusting means.

7. A surveillance sensor as claimed in claim 6, characterised in that the beam-orientation adjusting means comprise plates adjustable in angle, which plates are positioned at least in part of the outgoing beam.

8. A surveillance sensor as claimed in claim 6, characterised in that the beam-orientation adjusting means comprise an electronic beamformer based on a phased array principle.

9. A surveillance sensor as claimed in claim 1, characterised in that the electro-optical sensor is provided with second orientation stabilisation means.

10. A surveillance sensor as claimed in claim 9, characterised in that the second orientation stabilisation means comprise a mirror adjustable in angle and mounted on the optical axis of the electro-optical sensor.

11. A surveillance sensor as claimed in claim 9, characterised in that the second orientation stabilisation means comprise a cardan system in which the electro-optical sensor is suspended.

12. A surveillance sensor as claimed in claim 1, characterised in that the information originating from the surveillance radar antenna and the electro-optical sensor is combined on the basis of corresponding azimuth information.

13. A surveillance sensor as claimed in claim 1, characterised in that the track unit comprises a fast decision unit for effecting production from the combined information of a target track within the time required for one revolution of the surveillance sensor, if this information complies with preset criteria.

14. A surveillance sensor as claimed in claim 13, characterised in that the fast decision unit effects production of a target track from combined information representing a target for which the Doppler speed is substantially zero and the elevation is substantially at a visible horizon.

15. A surveillance sensor as claimed in claim 1, characterised in that the track unit is adapted to generate target tracks at predetermined time intervals by means of parametered track algorithms and the surveillance sensor is provided with a track support unit connected to the track unit for supplying the parameters for the track algorithms of the track unit at non-predetermined times.

* * * * *